United States Patent

Jones

[15] 3,671,786
[45] June 20, 1972

[54] MOTOR AND SEAL SECTION UTILIZING A FLUORINATED ETHER AS A SINGLE, HOMOGENOUS, BLOCKING COOLING AND LUBRICATING FLUID

[72] Inventor: Johnny W. Jones, Tulsa, Okla.
[73] Assignee: Borg-Warner Corporation, Chicago, Ill.
[22] Filed: July 6, 1970
[21] Appl. No.: 52,490

[52] U.S. Cl. .................................................310/87
[51] Int. Cl. ...............................................H02k 5/12
[58] Field of Search.....................................310/87

[56] References Cited

UNITED STATES PATENTS

| | | | |
|---|---|---|---|
| 3,182,214 | 5/1965 | Boyd........................................ | 310/87 |
| 2,309,707 | 2/1943 | Myers...................................... | 310/87 |
| 3,526,097 | 9/1970 | Nelson.................................. | 310/87 X |
| 1,855,274 | 4/1932 | Arutunoff................................ | 310/87 |
| 2,783,400 | 2/1957 | Arutunoff................................ | 310/87 |
| 1,953,216 | 4/1934 | Elsey...................................... | 310/87 X |
| 2,674,194 | 3/1954 | Arutunoff............................ | 310/87 X |
| 3,502,919 | 3/1970 | Boyd et al............................... | 310/87 |
| 3,475,634 | 10/1969 | Bogdanov et al. ....................... | 310/87 |
| 3,384,769 | 5/1968 | Schaefer et al. ......................... | 310/87 |

Primary Examiner—J. D. Miller
Assistant Examiner—Mark O. Budd
Attorney—Donald W. Banner, William S. McCurry and John W. Butcher

[57] ABSTRACT

A submersible motor and seal section containing a homogeneous lubricating and cooling fluid which, in addition, concurrently blocks the entry of ambient well fluid into the motor. The seal section is in fluid communication with the motor and with the ambient well environment. It accommodates thermal expansion and contraction of the lubricating and cooling fluid experienced due to the intermittent operation of the motor.

The fluid possesses essential properties of thermal conductivity, dielectric strength, lubricity, compatability with other motor component materials, and immiscibility with well fluid to provide lubrication and cooling of the motor and effective resistance to contamination by ambient well fluid.

5 Claims, 3 Drawing Figures

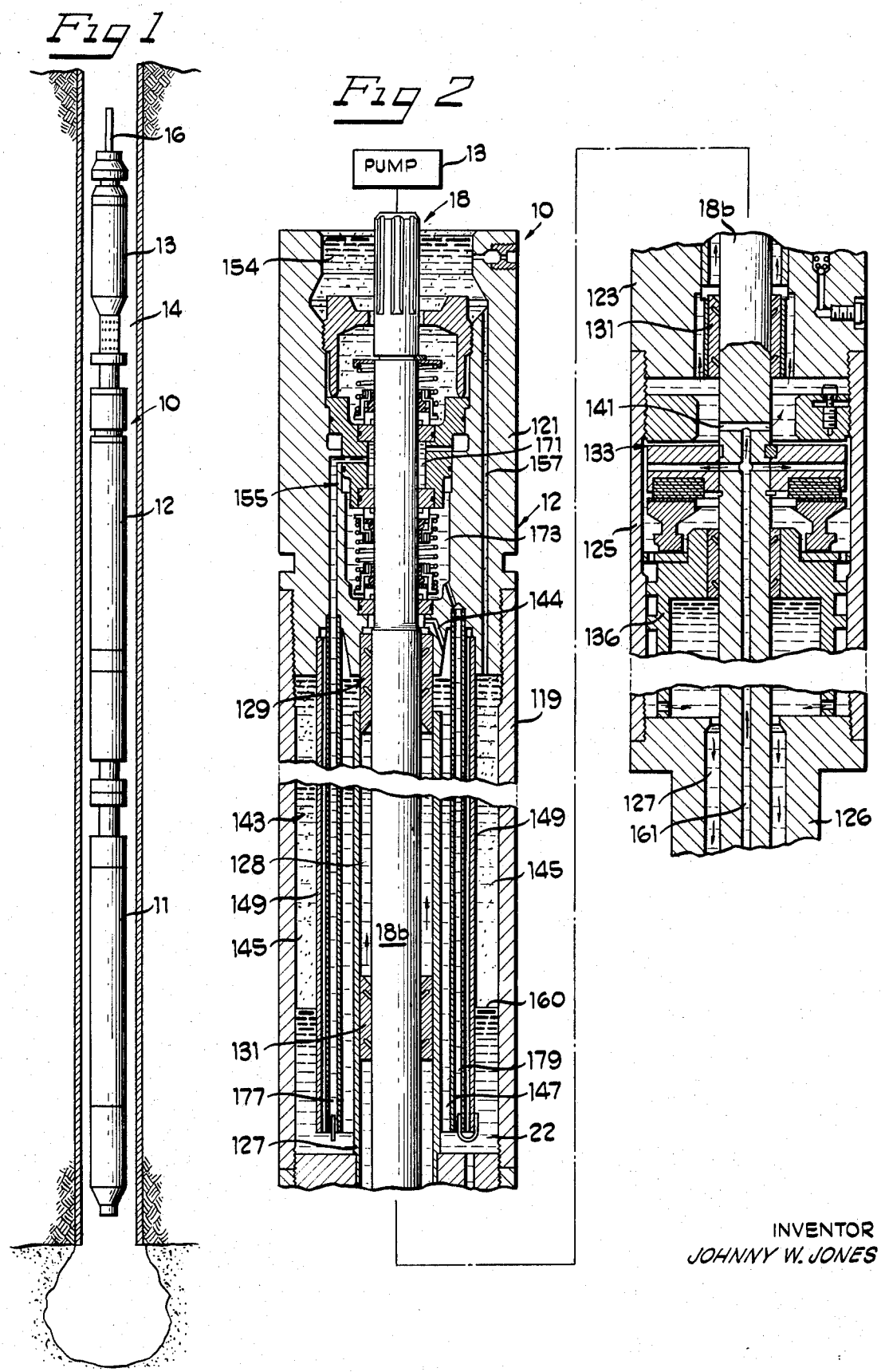

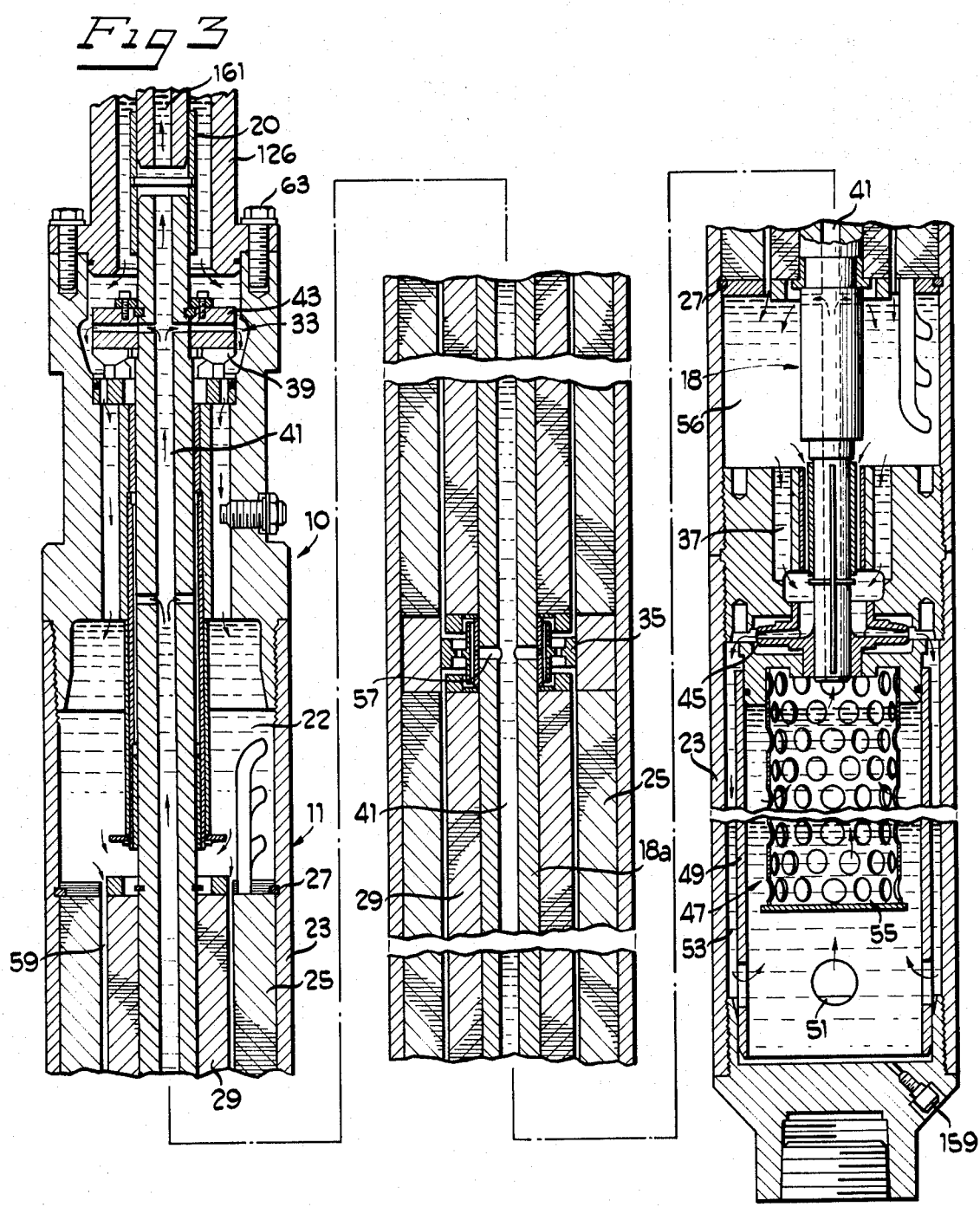

MOTOR AND SEAL SECTION UTILIZING A FLUORINATED ETHER AS A SINGLE, HOMOGENOUS, BLOCKING COOLING AND LUBRICATING FLUID

BACKGROUND OF THE INVENTION

This invention relates to a submersible motor and seal section for a submersible pump. More particularly, it relates to a submersible motor and seal section containing a single lubricating and cooling fluid which concurrently resists ingress of well fluid.

Submersible pumps are widely used for pumping water or crude oil from deep wells. Generally, these pumps include motor and seal section units filled with a fluid which serves as a coolant and a lubricant for the moving parts of the motor. The seal section is usually disposed between the pump and the motor along the operating shaft and includes at least one rotary seal which prevents ingress of well fluid along the shaft. In addition, the seal section serves as a reservoir for the lubricating and cooling fluid and accommodates expansion and contraction of the fluid during on-and-off cycling of the motor. Necessarily, the fluid in the seal section is in communication with the well environment to accommodate fluid expansion and therefore means must be provided to effectively block ingress of well fluid which would damage motor parts and ultimately result in premature breakdown.

A problem long associated with the design of submersible motors and seal sections has been that of effectively blocking ingress of ambient well fluid. The difficulty of separation of motor and well fluid was complicated by the miscibility of well fluid with known lubricating and cooling fluids. Also, solutions that effectively blocked ingress of well fluid were poor lubricants or ineffective coolants.

Recent developments have included utilization of an intermediate fluid interposed between the lubricating and cooling fluid and the ambient well fluid in the seal section. The intermediate fluid is insoluble in, and usually heavier than, both the lubricating and cooling fluid and the well fluid. Well fluid drawn into the seal section is separated from the lubricating and cooling fluid by the intermediate fluid. As a result, contamination of the motor is prevented.

Use of an intermediate fluid such as that described necessitates complicated seal section construction, to insure effective blockage of ambient well fluid over prolonged periods. In addition, critical assembly procedures and careful handling of the seal section are required to establish and maintain the proper relationship between the blocking fluid and the lubricating and cooling fluid.

Accordingly, it is the principal object of the present invention to provide an improved form of submersible motor and seal section including a single fluid to provide effective lubrication and cooling of the motor, while simultaneously providing an effective barrier to ingress of ambient well fluid.

SUMMARY OF THE INVENTION

Very generally, the present invention is directed to a submersible pump motor and seal section, including a single lubricating and cooling fluid that has a lubricity and thermal conductivity suitable to provide effective lubricating and cooling of motor components, as well as being immiscible with water and oil well ambient well fluids. The lubricating and cooling fluid, in addition, is compatible with other motor and seal section component materials, and maintains its properties over a wide range of operating temperatures.

Particular objects and advantages of the present invention will become apparent with reference to the following description and accompanying drawings.

DESCRIPTION OF THE DRAWINGS

FIG. 1 is an elevational view, on a reduced scale, and partially in section, showing a submersible motor and seal section disposed in operative association with a submersible pump and disposed within a well bore.

FIG. 2 is a continuous sectional elevational view of the seal section portion of a submersible motor and seal section illustrative of the features of the present invention.

FIG. 3 is a continuous sectional elevational view of the motor portion of a submersible motor and seal section illustrative of the features of the present invention.

DETAILED DESCRIPTION

Referring specifically to the drawing, there is illustrated a submersible motor and seal section generally designated 10 embodying the principles of the present invention comprising a motor 11 and a seal section 12.

As seen in FIG. 1 the motor and seal section 10 are normally operatively associated with a pump 13 deep below the surface of the earth in an oil or water well generally designated 14. Fluid piping 16 supports the pump, motor, seal section assembly within the well and appropriate electrical conductors (not shown) are connected between a power supply at the surface and the motor.

The pump 13 and motor 11 are connected by a common drive shaft generally designated 18 which extends through the seal section 12. The drive shaft is normally constructed of separate shaft sections, as illustrated, including a motor shaft 18a, a seal section shaft 18b and a pump shaft (not shown) which are connected together as at 20 form a single rotatable shaft.

The motor 11 is filled with a lubricating and cooling fluid 22 which insures prolonged motor service life even under adverse environmental conditions. The motor 11 and seal section 12 are connected in fluid tight relation and the seal section defines internal chambers which are also filled with the fluid 22 and are in communication with the motor 11. The seal section 12 is open to, and in communication with, the ambient well environment. In this way, volume increase due to expansion of the motor fluid is accommodated by displacement of fluid to the well cavity. However, by virtue of the communication of the seal section 12 with both the motor 10 and the well environment, it is essential that the fluid within the seal section block ingress of well fluid which would contaminate the motor and cause premature failure. The single fluid 22 of the motor and seal section of the present invention comprises both a lubricating and cooling fluid essential to motor operation and a blocking fluid which prevents contamination of the motor by ambient well fluid.

Referring now to FIG. 3, the motor 11 includes an outer housing or casing 23 which protects the inner motor elements from the fluid in the well. A stator 25 is affixed in the casing by snap rings 27.

A motor rotor 29 is supported by the motor shaft 18a internally of the motor stator 27. The rotor is affixed to the shaft in any suitable manner such as by a key and keyway arrangement.

The motor shaft 18a is supported within the motor for vertical operation by upper bearings generally designated 33, intermediate bearings located along the shaft generally designated 35, and lower bearings generally designated 37. The upper bearing 33 includes thrust pads 39 which support the axial thrust of the shaft and rotor.

The shaft 18a includes a central bore 41 which allows flow of the lubricating and cooling fluid internally of the drive shaft. The upper and lower ends of the shaft 18a are provided with impeller type pumps 43 and 45 which upon rotation of the drive shaft during motor operation effect pumping of the lubricating and cooling fluid within the motor casing 23 as indicated by the flow arrows.

The lowermost end of the casing 23 defines a fluid cooling arrangement 47 extending below the lowermost end of the shaft 18a. The cooling arrangement includes a cylindrical wall 49 spaced inwardly of the casing 23 and including a plurality of apertures 51. This wall defines with the casing a fluid path 53 adjacent the internal surface of the casing 23. Internally of the cylindrical wall 49 there is disposed a filter media 55 surrounding the end of the shaft 18a.

During motor operation the lower impeller pump 45 receives fluid from a chamber 56 below the rotor and stator and effects movement of the lubricating and cooling fluid 22 in the annular fluid path 53 in heat exchange relation with the casing 23 and radially inwardly through the apertures 51, through the filter media 55 and vertically upwardly through the central bore 41 of the motor shaft 18a.

The motor shaft includes transverse bores 57 at a periodic intervals which allow lubricating and cooling fluid to exit the central bore at intervals along the shaft such as at the bearing 35.

The central bore 41 is in communication with the upper impeller pump 43 and lubricating fluid is pumped radially outwardly through the upper impeller pump and flows downwardly through the casing as indicated by the flow arrows between the motor stator 25 and rotor 29 through gap spacing 59 and back to chamber 56.

A central bore 41 of the motor shaft 18a extends upwardly to the upper end of the shaft 18a. The motor shown in FIG. 3 is connected to the seal section 12 shown in FIG. 2 by bolts 63. The seal section prevents ingress of ambient well fluid along the operating shaft 18 into the pump motor 11 and further accommodates volume changes of the motor lubricating and cooling fluid due to temperature changes experienced during on and off cycling of the motor.

The seal section 12 as seen in FIG. 2 includes a tubular housing 119 having its upper end connected to a seal retainer 121 and a lower end connected to a partition member 123. A second tubular housing 125 extends from the partition member 123 and is secured to a connector head 126. These members are all axially aligned in surrounding relation to the shaft 18b. The seal retainer 121 is connected to the pump 13 and the upper end of the seal section shaft 18b is connected to the pump shaft.

A support tube 127 having an internal diameter larger than the diameter of the operating shaft 18b is disposed in surrounding relation to the shaft and defines an annular passage 128. The tube 127 is supported at its lower end in the partition member 123. It is supported at its upper end by a journal bearing 129 secured to the seal retainer 121. In addition, a plurality of sleeve type journal bearings 131 are disposed along the shaft which are affixed to the support tube 127 and serve to rotatably support the shaft 18b.

The second tubular housing 125 includes a thrust bearing assembly and impeller arrangement generally designated 133 which serves to rotatably support the shaft 18b against axial thrust and, in addition, provides for circulation of lubricating and cooling fluid associated with the motor 11. In addition it includes a heat exchange arrangement generally designated 136 through which circulated lubricating and cooling fluid is caused to flow in heat exchange relation with the internal surface of the tubular member 125. This cooled fluid then returns to the motor through the connector head 126 through passage 128.

The shaft 18b includes a central bore 161 in communication with the bore 41 of the shaft 18a. This bore extends upwardly for a portion of the length of the shaft 18b and terminates above the bearing and impeller arrangement 133.

A lateral passage 141 is provided in the shaft to allow the motor fluid to pass from the axial internal bore 161 to the annular passage 128 defined by the shaft and support tube 127. The sleeve type journal bearings 131 and bearing 129 include appropriately formed grooves which allow free passage of motor fluid along the shaft within the annular passage 128.

The outer surface of the support tube 127 and the inner surface of the tubular housing 119 define an elongated annular chamber 143 having an upper end defined by the seal retainer 121 and a lower end defined by the partition member 123. This chamber is divided into radially outer portion 145 and a radially inner portion 147 by tubular member 149.

A passage 144 provides communication between the annular passage 128 and the radially inner portion 147 at the upper end of the chamber. Therefore, the chamber 143 is in direct fluid communication with the motor 10 through the annular passage 128, lateral passage 141, and axial internal bore 161. In this manner, any expansion of motor fluid experienced due to increased temperature of the fluid will cause movement of the fluid upwardly through the annular passage 128 into the chamber 143. Conversely, any contraction of the motor fluid due to a reduction in motor fluid temperature will cause movement of motor fluid from the chamber 143 downwardly through the annular passage 128 to the motor.

A plurality of rotary seals generally designated 155 are provided within the seal retainer 121. They are disposed in surrounding relation to the shaft and provide an essentially fluid tight seal between the rotating shaft 18b and the nonrotating seal section 12. This arrangement prevents ingress of ambient well fluid into the motor 11 along the operating shaft. The seals 155 define with the seal retainer 121, chambers 171 and 173. These chambers are in communication with the lowermost end of the annular chamber 143 through conduits 177 and 179. The pumping action and circulation of ambient well fluid and the fluid 22 which occurs upon leakage of one or more of these seals and which acts to maximize the effective life of the seal section 11 is well known in the art and forms no part of this invention.

A chamber 154 defined by seal retainer 121 above the seals is in communication with the ambient well fluid along the extension of the shaft 18 upwardly to the pump 13. A conduit formed by a bore 157 in seal retainer 121 provides fluid communication between the chamber 154 and the radially outer portion 145 of the chamber 143. Thus a serpentine path communicating between the ambient well fluid at chamber 154 and the motor 11 is defined by the bore 157, the radially outer portions 145 of the bore 143, the radially inner portion 147, the bore 144, the passage 128, the transverse bore 141, the bore 161, and the bore 41 in the motor shaft 18a.

In accordance with the present invention the lubricating and cooling fluid 22 comprises a single homogenous fluid filling both the motor 11 and the seal section 12. The fluid possesses the necessary properties rendering it effective for lubricating and cooling of the motor and further for providing effective blockage of ambient well fluid within the seal section chamber 143 to prevent ingress of the well fluid through the central bore 161 of the seal section shaft into the motor 12.

To accomplish the functions of lubricating and cooling the motor 11, as well as blocking ingress of well fluids, the fluid 22 must possess certain essential properties. The fluid must have sufficient dielectric strength to preclude electrical breakdown due to its presence in the motor. It must be compatible with the motor components and in particular it must be compatible with the motor winding insulation and bearing materials. The fluid must possess sufficient lubricity to provide adequate protection for the bearings of the motor and seal section, even under heavy load and at elevated operating temperatures.

Since cooling of the motor is an important function of the fluid, it must have adequate thermal conductivity to insure dissipation of motor heat. In addition, it must withstand the temperatures experienced in the motor environment without loss of its essential properties.

To provide effective blocking of well fluid, the motor lubricating and cooling fluid 22 must be essentially immiscible in water and hydrocarbon fluids which are normally present in an oil or water well. Further, the specific gravity must be greater than the fluids present in the well to insure retention of the fluid 22 in the structure 10 to the exclusion of the ambient well fluid.

Fluids considered suitable for application as the combined lubricating and cooling fluid and blocking fluid 22 should preferably possess certain minimum properties, or at least sufficient combinations of these properties to render them effective for use in particular well environments. As can be appreciated, variations in well environment such as ambient well fluid composition, ambient temperature, and pumping load will dictate accompanying variations in the minimum acceptable properties of a suitable fluid. Generally, the following minimum properties are preferred for the lubricating and cooling and blocking fluid 22.

Dielectric strength — at least 30 KV per one-tenth inch at 80° C.
Maximum operating temperatures — above 250° F.
Coefficient of friction — at least 0.020 at 70° F., 400 RPM and a 100 lb. load.
Specific gravity — greater than 1.00 at 77° F.
Immiscibility — Immiscible in water and oil with specific gravities of 1 or less than 1.
Viscosity — about 95 Saybolts at 100° F.
Flash point — above 350° F.

One example of a fluid found particularly suitable as the fluid 22 is a fluorocarbon ether having a chemical composition:

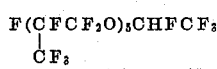

This fluid is one of a series of fluorinated ethers produced by E. I. DuPont & Company under the designation "Freon E" series. Homologs of the composition have been produced wherein "n" in the radical

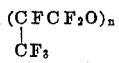

ranged from 1 to 5. Generally speaking, each of these homologs possess most of the properties making it suitable for use as the fluid 22. They are stable, both chemically and thermally, and are compatible with many plastics, elastomers and coatings. They are non-flammable, low in toxicity and possess a wide liquid range. They have a high dielectric strength and resistivity. In addition, they are an effective heat transfer media and are good lubricants at low and moderate temperatures. Further, they are less than 1 per cent soluble in hydrocarbon oil at 75° F. and the solubility in water at 77° F. is less than 25 parts per million.

The homolog $n=5$ is particularly suitable because of its high boiling point and ability to withstand elevated operating temperatures normally encountered in well pumping operations. In addition, this homolog presents superior resistance to water contamination. At 77° F. the solubility of water in the homolog, $n=5$, is negligible.

Some of the important properties of the homolog $n=5$ of the fluorinated ether are summarized as follows:

| | |
|---|---|
| [1]Breakdown voltage Liquid | 49 KV (rms) |
| Boiling point | 435.6°F. |
| Specific gravity at 77°F. | 1.79 |
| Solubility in water at 77°F. | less than 25 ppm. |
| Solubility of water at 77°F. | nil |
| Solubility in Sunoco AHT transformer oil at 77°F. | less than 1% |
| Solubility of Sunoco AHT transformer oil at 77°F. | less than 1% |
| Thermal conductivity at 77°F. | 0.0387 Btu/(hr) (ft) (°F) |
| Viscosity at 77°F. | 0.5 to 0.7 Cp. |

[1] ASTM D 877, 0.1" gap between planes one atmosphere, 25°C.

One particular fluid is specifically described. However, as can be appreciated, any fluid may be used as long as it possesses sufficient of the various preferred minimum properties disclosed to operate effectively in the particular well environment.

At assembly, the entire motor and seal section 10 is filled with the homogeneous lubricating and cooling and blocking fluid 22 such as the homolog $n=5$ of the fluorinated ether. Filling is accomplished through appropriate filler ports such as the port 159 shown in FIG. 3.

Placement of the motor and seal section 10 in a well, generally speaking, results in an increase in temperature due to the higher ambient temperature in the well environment. This increase in temperature causes expansion of the fluid 22 and a small quantity of fluid is expelled to the well through the bore 157 and top chamber 154. Motor operation further increases fluid temperature and an additional quantity of fluid 22 is expelled from the motor and seal section.

When the motor is shut down, the fluid will cool to the ambient temperature of the well, and will contract allowing well fluid to enter the bore 157 and the uppermost end of the radially outer portion 145 of the chamber 143.

Due to the specific gravity of the fluid 22 the lubricating and cooling and blocking fluid will remain in the lower portion of the chamber 143. Since the fluid is essentially immiscible in well fluid, an interface will be formed, as illustrated at 160, and no well fluid will be allowed to enter the remainder of the seal section.

Subsequent on-and-off cycling of the motor 11 will cause the interface to move upwardly and downwardly within the radially outer portion 147 of the chamber 143. The volume of the radially outer portion is sufficient to prevent movement of the interface 160 below the bottom end of the tubular member 149 during off cycles of the motor. The volume of the radially outer portion therefore must be at least equal to the contemplated change in volume of the fluid 22 between maximum and minimum temperature conditions.

The motor 11 is protected against ingress of ambient well fluid until leakage of the seals 155 or loss of fluid 22 to the well allows sufficient quantities of well fluid to enter the seal section 12 that upon cooling, the well fluid contracts into the motor. However, the use of a motor and seal section of the type described, possessing the homogeneous lubricating and cooling and blocking fluid 22 is expected to provide satisfactory service, even under extreme environmental conditions, for a period far exceeding the expected lifetime of the associated well pump. Therefore, an efficient and effective arrangement is disclosed which, through the use of a single motor fluid, provides for cooling, lubrication and protection from contamination insuring continued motor reliability during its service life.

It must be appreciated that the particular motor and seal section disclosed were for illustrative purposes only, and any suitable motor or seal section configuration may be used without departing from the scope of the invention.

What is claimed is:

1. A submersible pump motor and seal section including a longitudinally elongated electric motor including a stator, a rotor rotatably supported with respect to said stator, said rotor including a shaft extending longitudinally outward of said motor, a seal section surrounding said shaft and connected in fluid tight relation to said motor, said seal section including at least one rotary seal disposed in sealing engagement with said shaft, said seal section defining, between said motor and said rotary seal, at least one hollow chamber in fluid communication with said motor and with the ambient well environment, and a single homogenous lubricating, cooling and blocking fluid filling said motor and at least a portion of said seal section chamber, said fluid being essentially immiscible with ambient well fluid to block ingress of well fluid into said seal section, and being effective to provide lubrication and cooling of said motor wherein said single homogenous fluid is a fluorinated ether which has a specific gravity greater than one.

2. A submersible pump motor and seal section as claimed in claim 1 wherein said single homogeneous fluid is a fluorinated ether having a chemical composition of

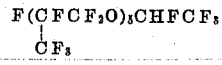

3. A submersible pump motor and seal section as claimed in claim 1 wherein said fluorinated ether possesses a breakdown voltage of about 49 KV (rms), liquid, ASTM D 877, 0.1 inch gap between planes 1 atmosphere, 25° C., a boiling point of about 435.6° F., a specific gravity at 77° F. of about 1.79, a solubility in water at 77° F. of less than 25 ppm., a negligible solubility of water at 77° F., a solubility in Sunoco AHT transformer oil at 77° F. of less than 1 percent, a solubility of Sunoco AHT transformer oil at 77° F. of less than 1 percent, a thermal conductivity at 77° F. of about 0.0387 Btu/(hr)(ft)° F.), and a viscosity at 77° F. of about 0.5 to 0.7 Cp.

4. A submersible pump motor and seal section as claimed in claim 1 wherein said single homogeneous fluid possesses a dielectric strength of about at least 30 KV per one-tenth inch at 80° C., a maximum operating temperature above 250° F., a coefficient of friction of at least 0.020 at 70° F., 400 RPM and a 100 lb. load, a specific gravity greater than 1.00 at 77° F., a viscosity of about 95 Saybolts at 100° F., a flash point above 350° F., and is immiscible in water and oil with specific gravities of 1 or less than 1.

5. A submersible pump motor and seal section as claimed in claim 1 wherein said communication between said seal section and said motor is disposed in spaced relation to said communication between said seal section and the ambient well environment and the volume of said single homogeneous cooling, lubricating and blocking fluid in said seal section is greater than the change in volume of said fluid in said motor during on-and-off cycling of the motor.

* * * * *